(12) United States Patent
Hashimoto

(10) Patent No.: US 11,247,531 B2
(45) Date of Patent: Feb. 15, 2022

(54) VEHICLE AIR CONDITIONING UNIT

(71) Applicant: DENSO CORPORATION, Kariya (JP)

(72) Inventor: Hiroki Hashimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 270 days.

(21) Appl. No.: 16/529,161

(22) Filed: Aug. 1, 2019

(65) Prior Publication Data

US 2019/0351737 A1    Nov. 21, 2019

Related U.S. Application Data

(63) Continuation of application No. PCT/JP2018/001433, filed on Jan. 18, 2018.

(30) Foreign Application Priority Data

Feb. 15, 2017  (JP) .............................. JP2017-026226
Nov. 27, 2017  (JP) .............................. JP2017-227065

(51) Int. Cl.
*B60H 1/00* (2006.01)
*B60H 1/34* (2006.01)

(52) U.S. Cl.
CPC ....... *B60H 1/00764* (2013.01); *B60H 1/3414* (2013.01)

(58) Field of Classification Search
CPC .......................... B60H 1/00742; B60H 1/3414
USPC ................................................ 454/152, 155
See application file for complete search history.

(56) References Cited

U.S. PATENT DOCUMENTS

| | | | | |
|---|---|---|---|---|
| 8,210,913 B2* | 7/2012 | De Marino | ........ | B60H 1/00742 |
| | | | | 454/152 |
| 2002/0019213 A1* | 2/2002 | Yoshinori | .......... | B60H 1/00742 |
| | | | | 454/155 |
| 2016/0272038 A1* | 9/2016 | Tanaka | ................. | B60N 2/5657 |
| 2019/0126720 A1* | 5/2019 | Gomez Mata | ..... | B60H 1/00871 |

FOREIGN PATENT DOCUMENTS

| | | |
|---|---|---|
| DE | 4226747 C1 | 12/1993 |
| JP | H0558148 A | 3/1993 |
| JP | 2002-046445 A | 2/2002 |
| JP | 2005225377 A | 8/2005 |
| JP | 2007230325 A | 9/2007 |
| JP | 2017210019 A | 11/2017 |
| JP | 2018131196 A | 8/2018 |
| WO | WO-2016067594 A1 | 5/2016 |

* cited by examiner

*Primary Examiner* — Vivek K Shirsat
*Assistant Examiner* — Ko-Wei Lin
(74) *Attorney, Agent, or Firm* — Harness, Dickey & Pierce, P.L.C.

(57) ABSTRACT

A vehicle air conditioning unit is installed in a vehicle, and the vehicle travels with self-driving that eliminates need for an occupant to operate the vehicle by a foot of the occupant and normal driving that requires the occupant to operate the vehicle by the foot. The vehicle air conditioning unit includes a foot outlet portion that defines a foot outlet open in a vehicle cabin, blown air flowing through the foot outlet toward the foot of the occupant, and an outlet changing device that changes a position to which the blown air flowing through the foot outlet flows. A controller of the vehicle is configured to control the outlet changing device such that the blown air is directed further rearward during the self-driving compared to during the normal driving.

1 Claim, 5 Drawing Sheets

US 11,247,531 B2

VEHICLE AIR CONDITIONING UNIT

CROSS REFERENCE TO RELATED APPLICATIONS

The present application is a continuation application of International Patent Application No. PCT/JP2018/001433 filed on Jan. 18, 2018, which designated the United States and claims the benefit of priority from Japanese Patent Application No. 2017-026226 filed on Feb. 15, 2017, and Japanese Patent Application No. 2017-227065 filed on Nov. 27, 2017. The entire disclosures of all of the above applications are incorporated herein by reference.

TECHNICAL FIELD

The present disclosure relates to a vehicle air conditioning unit.

BACKGROUND

As this type of vehicle air conditioning unit, a conventional air conditioning system for use in a vehicle is known. The air conditioning system emits conditioned air from a plurality of outlets provided in a vehicle cabin at a vehicle front location. The plurality of outlets includes, for example, a defroster outlet, a face outlet, and a foot outlet.

SUMMARY

According to an aspect of the present disclosure, a vehicle air conditioning unit is installed in a vehicle travelling with self-driving that eliminates need for an occupant to operate the vehicle by a foot of the occupant and normal driving that requires the occupant to operate the vehicle by the foot. The vehicle air conditioning unit includes a foot outlet portion that defines a foot outlet open in a vehicle cabin, blown air flowing through the foot outlet toward the foot of the occupant; an outlet changing device that changes a position to which the blown air flowing through the foot outlet flows; and a controller configured to control the outlet changing device such that the blown air is directed further rearward during the self-driving compared to during the normal driving.

EMBODIMENTS

Figure 7:
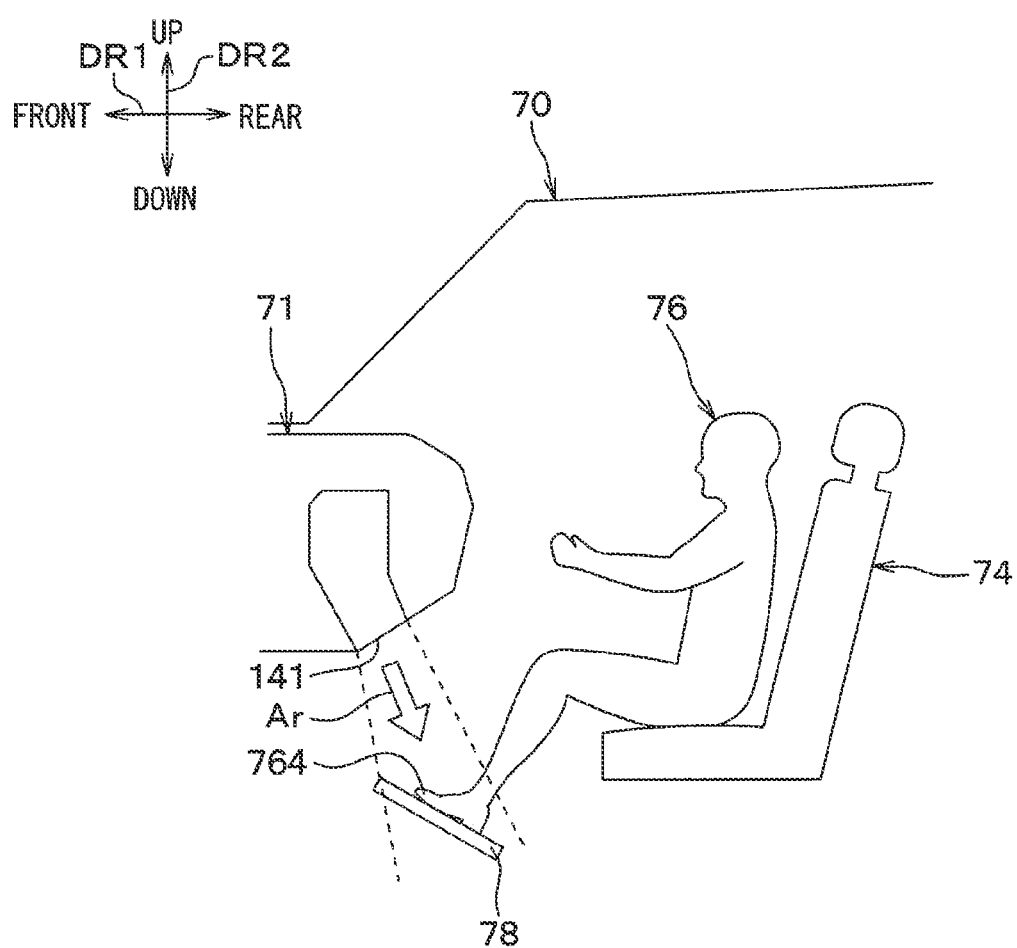
FIG. 7 is a first diagram for describing a conventional vehicle air conditioning unit, illustrating a posture of an occupant observed during the normal driving.

Before embodiments are described, a conventional vehicle air conditioning unit is described. As illustrated in FIG. 7, a foot outlet 141 of the conventional vehicle air conditioning unit is placed in a lower portion of an instrument panel 71 in a vehicle cabin. Air Ar is emitted from the foot outlet 141 in a fixed direction.

The foot outlet 141 is configured to emit air appropriately, for example, toward a foot area of an occupant 76 in a pedal operation posture where the occupant 76 is seated in a driver's seat 74 with a foot 764 of the occupant 76 placed on an accelerator pedal 78 or the like. When the foot 764 of the occupant 76 is placed on, for example, the accelerator pedal 78, the emitted air Ar from the foot outlet 141 is directed at feet 764 of the occupant 76 appropriately as illustrated in FIG. 7.

Figure 8:
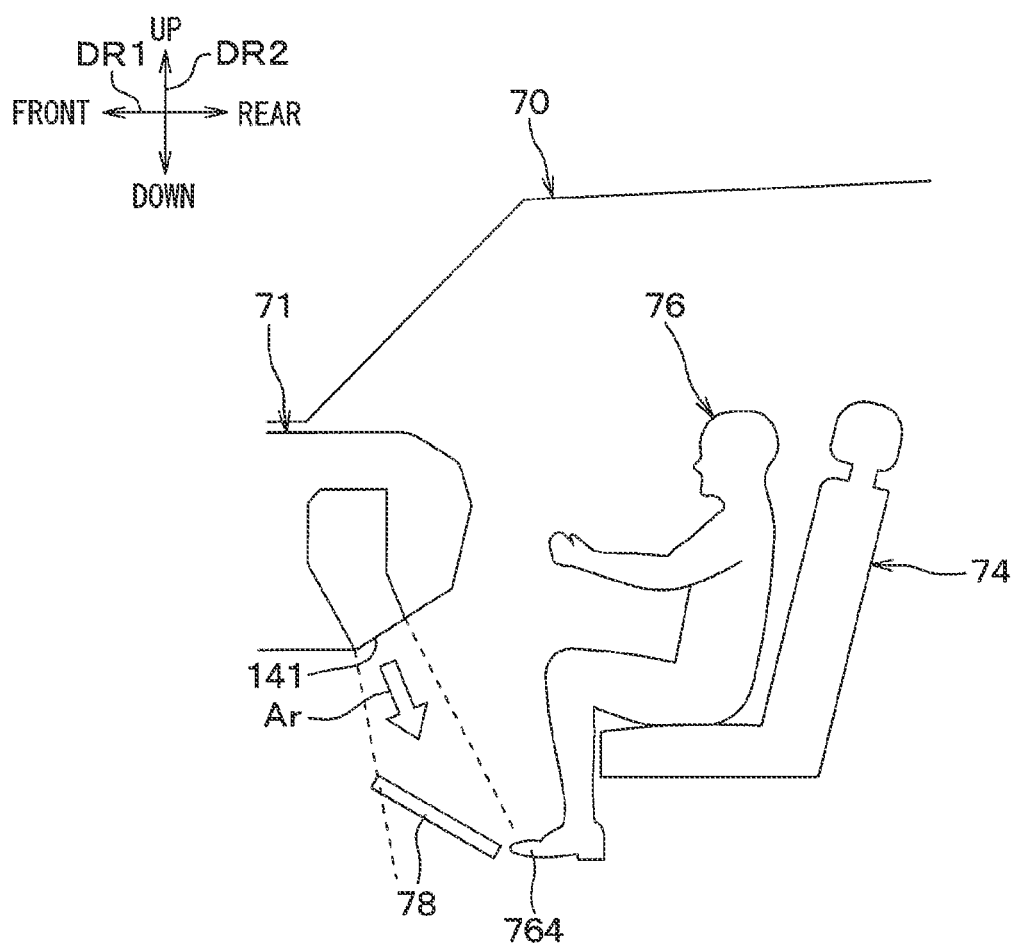
FIG. 8 is a second diagram for describing the conventional vehicle air conditioning unit, illustrating a posture of the occupant observed during the self-driving.

However, a vehicle 70 equipped with self-driving capability is developed in recent years. When the vehicle 70 is traveling using self-driving capability, pedal operations on the accelerator pedal 78 and the like are not required. The occupant 76 is thus in a posture where the feet 764 are placed further toward the rear of the vehicle than the accelerator pedal 78, as illustrated in FIG. 8. In the conventional vehicle air conditioning unit, the direction in which air Ar is emitted from the foot outlet 141 is fixed. Thus, the emitted air Ar from the foot outlet 141 is not appropriately directed at the feet 764 of the occupant 76.

A vehicle air conditioning unit 10 according to an embodiment described below is configured in view of the points described above.

Some embodiments are described below with reference to the drawings.

In the following embodiments including other embodiments described below, identical or equivalent elements are designated with identical symbols in the drawings.

First Embodiment

Figure 1:
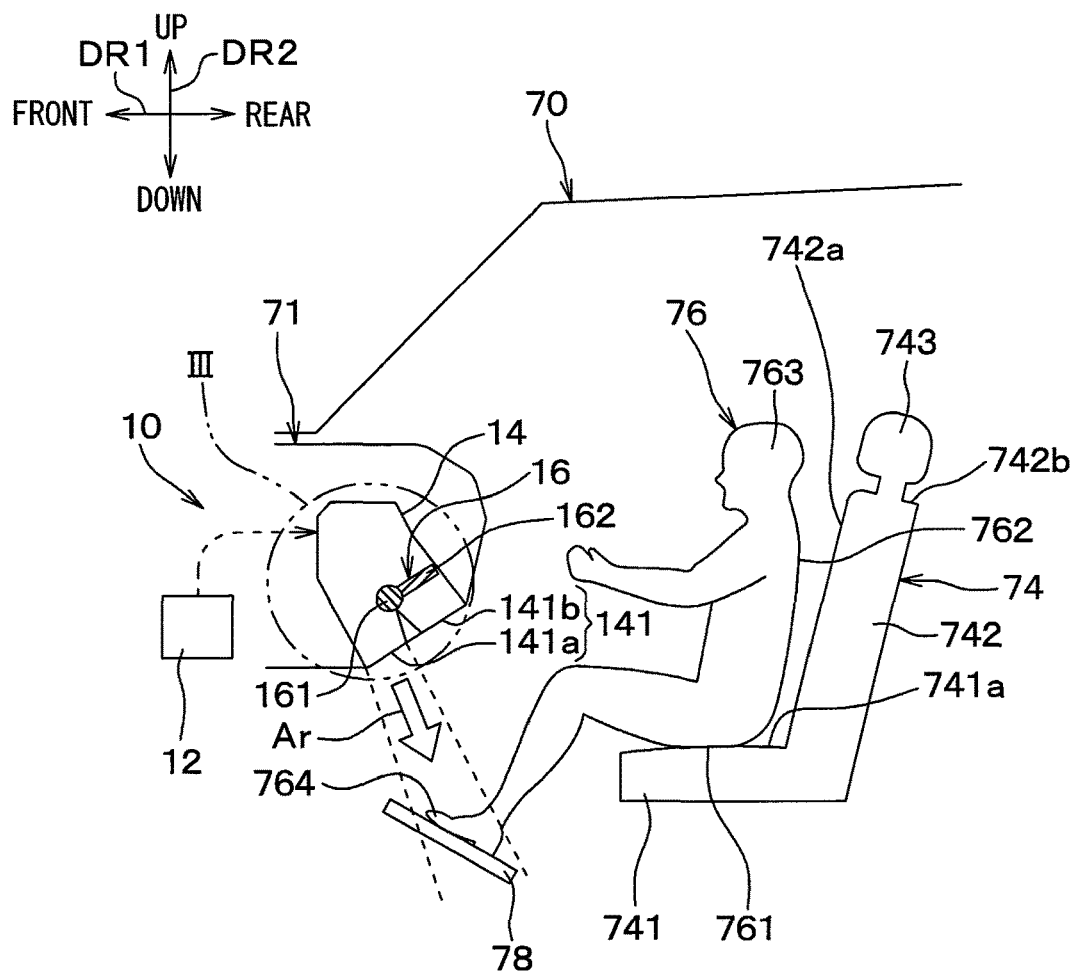
FIG. 1 is a schematic diagram of main portions of a vehicle air conditioning unit according to a first embodiment, a driver's seat, and a nearby area of the driver's seat in a vehicle cabin, illustrating a situation in the nearby area of the driver's seat observed while normal driving is performed.

FIG. 1 is a schematic diagram of main portions of the vehicle air conditioning unit 10 according to the present embodiment, a driver's seat 74, and a nearby area of the driver's seat 74 in a vehicle cabin. In FIG. 1, a view from the left side of the vehicle is provided, and an instrument panel 71 and the inside of the instrument panel 71 are illustrated in a sectional view.

The vehicle air conditioning unit 10 illustrated in FIG. 1 emits conditioned air with regulated temperature into the vehicle cabin. The vehicle air conditioning unit 10 is installed in a vehicle 70. The vehicle air conditioning unit 10 configures a vehicle air conditioning system together with a compressor and a condenser that are placed outside the vehicle cabin (for example, in an engine compartment) and configure a refrigerating cycle.

As illustrated in FIG. 1, the vehicle air conditioning unit 10 is placed in the vehicle cabin toward the front of the vehicle. Specifically, the vehicle air conditioning unit 10 is placed in the instrument panel 71 provided in the vehicle cabin in a vehicle front location. The instrument panel 71 is placed further toward the front of the vehicle than a front seat provided in the vehicle cabin.

The front seat is the frontmost one of the plurality of seats arranged in a vehicle front-rear direction DR1 in the vehicle cabin of the vehicle 70 in which the vehicle air conditioning unit 10 is installed. The front seat is a collective term for the driver's seat 74 and a passenger seat. The front seat is oriented to the front of the vehicle in the vehicle cabin. In FIG. 1, the driver's seat 74 of the front seat is illustrated.

Arrows DR1 and DR2 in FIG. 1 indicate directions with respect to the vehicle 70 in which the vehicle air conditioning unit 10 is installed. The arrow DR1 represents the vehicle front-rear direction DR1, and the arrow DR2 represents a vehicle up-down direction DR2.

Figure 2:
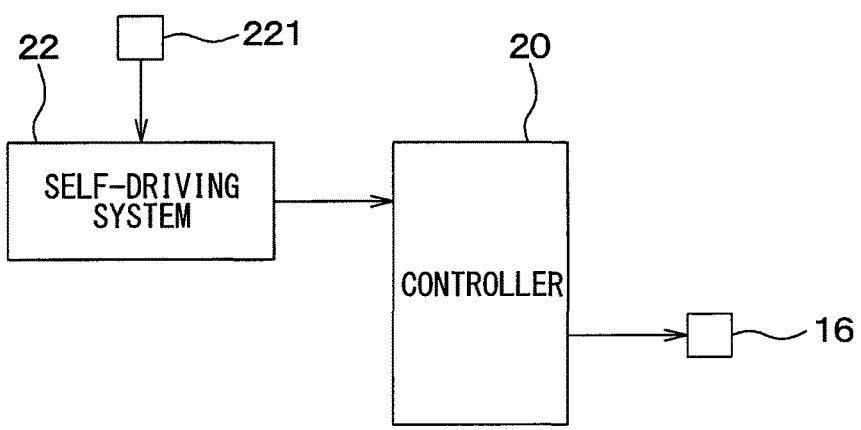
FIG. 2 is a block diagram of a control system of the vehicle air conditioning unit according to the first embodiment.

As illustrated in FIGS. 1 and 2, the vehicle air conditioning unit 10 includes a blower 12, an outlet changing device 16, a controller 20, a plurality of outlet portions, a cooling heat exchanger, a heating heat exchanger, an air conditioning case, and the like. The cooling heat exchanger is, for example, an evaporator included in the refrigerating cycle. The heating heat exchanger is, for example, a heater core that heats air using engine coolant. The cooling heat exchanger, the heating heat exchanger, and the air conditioning case are not shown. The air conditioning case, for example, internally includes an air passageway through which air emitted by the blower 12 passes. The cooling heat exchanger and the heating heat exchanger are placed in the air passageway.

In the vehicle air conditioning unit 10, the temperature of air from the blower 12 is regulated by the cooling heat exchanger and the heating heat exchanger. Air or conditioned air with regulated temperature is emitted from any of the plurality of outlet portions into the vehicle cabin. The plurality of outlet portions include, for example, a foot outlet portion 14 illustrated in FIG. 1, a face outlet portion (not shown), and a defroster outlet portion (not shown). FIG. 1 describes how air from the blower 12 is emitted from the foot outlet portion 14 into the vehicle cabin.

The foot outlet portion 14 in FIG. 1 is placed in a lower location in the vehicle cabin toward the front of the vehicle, i.e., in a lower portion of the instrument panel 71. The foot outlet portion 14 includes a foot outlet 141 that is open in the vehicle cabin.

The foot outlet 141 is an outlet that emits air toward a foot area of an occupant 76. The occupant 76 is a driver, who is one of the occupants in the front seat. The foot outlet 141 is open at a location further toward the front of the vehicle than the front seat of the vehicle 70.

Figure 3:
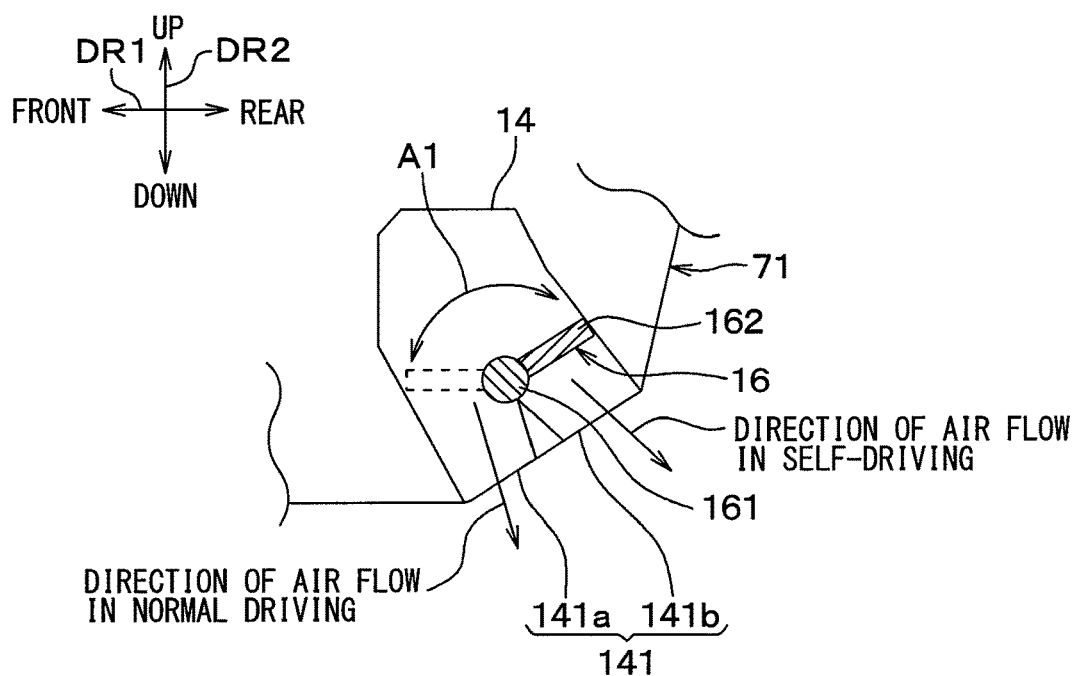
FIG. 3 is an enlarged view of a portion of FIG. 1 marked with III, illustrating relationships between operations of an outlet changing device and corresponding directions of emitted air.

As illustrated in FIGS. 1 and 3, the foot outlet 141 is divided into a plurality of outlets 141a and 141b. In the present embodiment, the foot outlet 141 includes the first outlet 141a and the second outlet 141b. The first outlet 141a and the second outlet 141b each emit air obliquely downward, rather than vertically downward, toward the rear of the vehicle. The second outlet 141b directs air further toward the rear of the vehicle than does the first outlet 141a. An arrow Ar in FIG. 1 represents emitted air Ar from the foot outlet 141 into the vehicle cabin.

Specifically, the first outlet 141a is open toward feet 764 of the occupant 76 in a pedal operation posture, as illustrated in FIG. 1. Emitted air Ar from the first outlet 141a is thus directed at the feet 764 of the occupant 76 when the occupant 76 is in the pedal operation posture. The pedal operation posture is one of driving postures of the occupant 76 and it is a posture where the occupant 76 is seated in the driver's seat 74 with one of the feet 764 placed on the accelerator pedal 78 and the other on a footrest.

Figure 4:
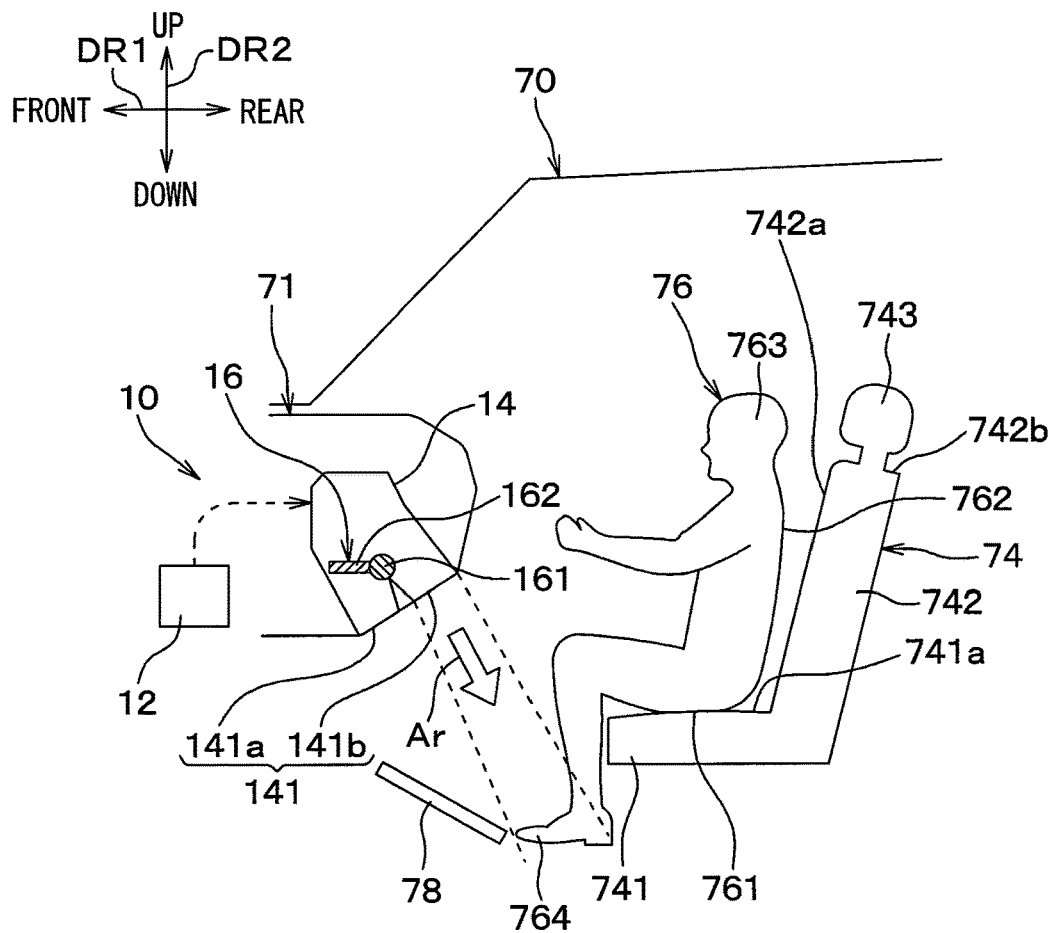
FIG. 4 is a schematic diagram of the main portions of the vehicle air conditioning unit according to the first embodiment, the driver's seat, and the nearby area of the driver's seat in the vehicle cabin, illustrating a situation in the nearby area of the driver's seat observed while self-driving is performed.

As illustrated in FIG. 4, the second outlet 141b is open toward the feet 764 of the occupant 76 in a non-pedal operation posture where the occupant 76 is seated in the driver's seat 74 with the feet 764 placed further toward the rear of the vehicle than the accelerator pedal 78. Emitted air Ar from the second outlet 141b is thus directed at the feet 764 of the occupant 76 when the occupant 76 is in the non-pedal operation posture.

The driver's seat 74 is a seat that the occupant 76 is seated in. The occupant 76 is the driver who is one of the occupants in the front seat. The driver's seat 74 includes a seat cushion 741, a seat back 742, and a headrest 743. The seat cushion 741 is a seat portion on which a seating surface 741a is formed. The hip 761 of the occupant 76 contacts the seating surface 741a. That is, the seat cushion 741 supports the occupant 76 from beneath the occupant 76.

The seat back 742 is a backrest portion of the seat and a backrest surface 742a is formed thereon. The backrest surface 742a faces the back 762 of the occupant 76. The back 762 contacts the backrest surface 742a. That is, the seat back 742 supports the occupant 76 from the back 762 side of the occupant 76.

The headrest 743 supports the head 763 of the occupant 76 from the vehicle rear side and is coupled to an upper end 742b of the seat back 742.

FIG. 1 illustrates a state in which the occupant 76 is in the pedal operation posture while driving the vehicle 70. As illustrated in FIG. 1, the backrest surface 742a, which contacts the back 762 of the occupant 76, substantially faces toward the front of the vehicle 70 while the vehicle 70 is being driven.

The vehicle 70 in the present embodiment can travel with normal driving and self-driving. Self-driving in the present embodiment refers to self-driving at level 3 or level 4 in a self-driving level classification. At the self-driving level 3 or 4, the vehicle 70 automatically performs all of acceleration, steering, and braking of the vehicle 70. During the self-driving in the present embodiment, the need for the occupant 76 to operate the vehicle using the foot 764 (for example, operating the accelerator pedal 78 and the brake pedal) as well as the need for the occupant 76 to perform steering operation are eliminated.

The normal driving in the present embodiment does not include self-driving of the vehicle 70 and requires the occupant 76 to operate the vehicle using the foot 764. Acceleration and braking of the vehicle 70 is performed by operating the accelerator pedal 78 and the brake pedal; thus, it can be said that the normal driving is driving of the vehicle where the occupant 76 performs the acceleration and braking of the vehicle 70.

Since, in the normal driving, the occupant 76 is required to operate the vehicle using the foot 764, the normal driving does not include a situation where, for example, the vehicle 70 is at a temporary stop, thus eliminating the need for the occupant 76 to perform braking operation using the foot 764. The situation in which the vehicle 70 is at a temporary stop, thus eliminating the need for the occupant 76 to perform the braking operation using the foot 764 corresponds to a specific situation where the vehicle 70 is at a temporary stop with the parking brake on, which prevents the vehicle 70 from moving. The normal driving of the vehicle 70 may include, not only the driving that requires the occupant 76 to operate the vehicle using the foot 764, but also driving that requires the occupant 76 to perform the steering operation.

In the present embodiment, the self-driving is controlled by a self-driving system 22 included in the vehicle 70. The self-driving system 22, which is illustrated in FIG. 2, includes an electronic controller and a plurality of sensors.

As illustrated in FIG. 2, the self-driving system 22 is electrically connected to a self-driving switch 221 disposed in the vehicle cabin for operation by the occupant 76. The self-driving switch 221 includes, for example, a push switch. For example, when the occupant 76 operates the self-driving switch 221 while the self-driving is not performed, the self-driving system 22 starts performing the self-driving on condition that a predetermined prerequisite for performing the self-driving is satisfied. When the occupant 76 operates the self-driving switch 221 while the self-driving is performed, the self-driving system 22 stops performing the self-driving. The self-driving system 22 sequentially outputs information indicative of whether the self-driving is being performed to the controller 20 of the vehicle air conditioning unit 10.

The blower 12 of the vehicle air conditioning unit 10 illustrated in FIG. 1 includes a motor (not shown) and a fan (not shown). The fan is coupled to the motor and rotated by the motor. For example, the number of revolutions of the motor of the blower 12, i.e., the number of revolutions of the fan, increases as blower motor voltage applied to the motor increases. An air current from the blower 12 is subjected to temperature regulation and then emitted to the vehicle cabin from one or more of the foot outlet portion 14, the face outlet portion, and the defroster outlet portion in accordance with an outlet mode of the vehicle air conditioning unit 10.

As illustrated in FIGS. 1, 3, and 4, the outlet changing device 16 changes a location at which emitted air Ar from the foot outlet 141 is directed within the foot area of the occupant 76 in the vehicle cabin. Specifically, the outlet changing device 16 switches a target location at which the emitted air Ar is directed such that the target location moves in the vehicle front-rear direction DR1.

The outlet changing device 16 is configured as a door mechanism and includes an actuator (not shown), a turning shaft 161 coupled to the actuator, and a turning door 162 that has a plate shape and turns together with the turning shaft 161. The turning door 162 is accommodated in the foot outlet portion 14. The actuator of the outlet changing device 16 turns the turning shaft 161 and the turning door 162 as indicated by an arrow A1 in response to a control signal from the controller 20.

The outlet changing device 16 is configured to switch between a first state and a second state by using elements such as the turning door 162. The first state of the outlet changing device 16 is a state where the outlet changing device 16 opens the first outlet 141a and closes the second outlet 141b. As illustrated in FIG. 1, the turning door 162 is thus positioned at an angle position that closes the second outlet 141b, placing the outlet changing device 16 in the first state.

The second state of the outlet changing device 16 is a state where the outlet changing device 16 opens the second outlet 141b and closes the first outlet 141a. As illustrated in FIG. 4, the turning door 162 is thus positioned at an angle position that closes the first outlet 141a, placing the outlet changing device 16 in the second state.

The controller 20 illustrated in FIG. 2 is an electronic controller configured using a microcomputer including a CPU (not shown), a ROM (not shown), a RAM (not shown), and the like. Signals from a sensor and the like connected to the controller 20 are subjected to A/D conversion in an input circuit (not shown) and then input to the microcomputer. Semiconductor memories such as the ROM and the RAM are non-transitory tangible storage media.

In the present embodiment, the controller 20 controls, for example, the blower motor voltage used as a control signal for the blower 12. The controller 20 also outputs a control signal for operating the actuator of the outlet changing device 16 to the actuator. That is, by outputting the control signal, the controller 20 alternatively switches the outlet changing device 16 between the first state illustrated in FIG. 1 and the second state illustrated in FIG. 4.

The controller 20 functions as an air conditioning controller that performs various air conditioning control processes in the vehicle air conditioning unit 10. A control process illustrated in FIG. 5 is one of the air conditioning control processes.

Figure 5:
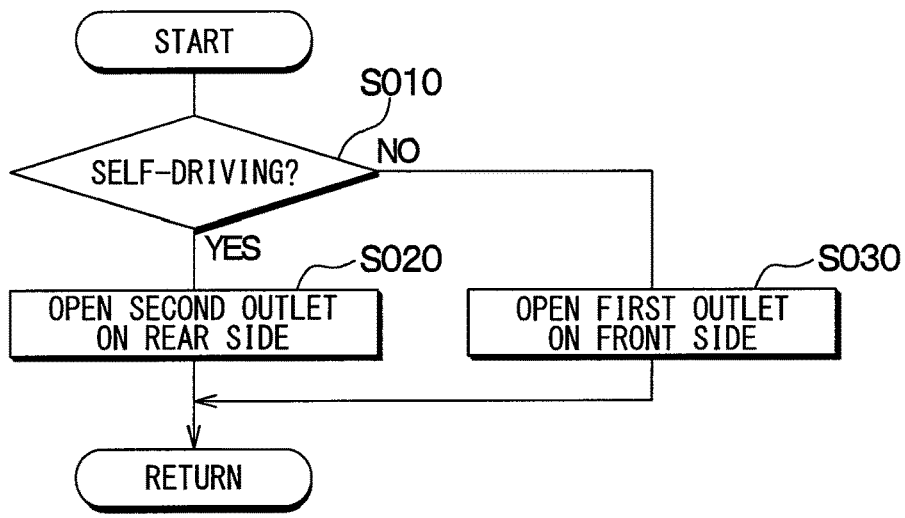
FIG. 5 is a flowchart of a control process performed by a controller included in the vehicle air conditioning unit according to the first embodiment.

FIG. 5 is a flowchart describing the control process performed by the controller 20. When an outlet mode of the vehicle air conditioning unit 10 where the foot outlet 141 emits air is started, the controller 20 starts the control process described in FIG. 5. The outlet mode where the foot outlet 141 emits air may be a mode where only the foot outlet 141 emits air or a mode where the foot outlet 141 and an outlet other than the foot outlet 141 emit air simultaneously.

After starting the control process described in FIG. 5, the controller 20 repeats the process in FIG. 5 periodically. The controller 20 finishes the control process described in FIG. 5 when the vehicle air conditioning unit 10 is stopped or when the outlet mode where the foot outlet 141 emits air is cancelled.

As illustrated in FIG. 5, in step S010, the controller 20 determines whether the self-driving is being performed. Information indicative of whether the self-driving is being performed is obtained from the self-driving system 22 illustrated in FIG. 2.

If it is determined in step S010 that the self-driving is being performed, the process proceeds to step S020. If it is determined in step S010 that the self-driving is not being performed, which is, for example, that the normal driving is being performed, the process proceeds to step S030.

In step S020, the controller 20 places the outlet changing device 16 in the second state as illustrated in FIG. 4. If the outlet changing device 16 is already in the second state, the outlet changing device 16 is maintained in the second state. That is, the controller 20 opens the second outlet 141b, which is a portion of the foot outlet 141 that is placed toward the rear of the vehicle, so that the second outlet 141b emits air Ar. After step S020, the process in FIG. 5 reverts back to step S010.

In step S030, the controller 20 places the outlet changing device 16 in the first state as illustrated in FIG. 1. If the outlet changing device 16 is already in the first state, the outlet changing device 16 is maintained in the first state. That is, the controller 20 opens the first outlet 141a, which is a portion of the foot outlet 141 that is placed toward the front of the vehicle, so that the first outlet 141a emits air Ar. After step S030, the process reverts back to step S010.

As described in the control process in FIG. 5, the controller 20 places the outlet changing device 16 in the first state in step S030 when the normal driving is being performed. The controller 20 places the outlet changing device 16 in the second state in step S020 when the self-driving is being performed. The controller 20 thus controls the outlet changing device 16 such that emitted air Ar is directed further toward the rear of the vehicle during the self-driving than during the normal driving.

Processing in each step in FIG. 5 described above configures a functional unit that achieves a corresponding function.

As described above, the controller 20 controls the outlet changing device 16 such that emitted air Ar is directed further toward the rear of the vehicle during the self-driving than during the normal driving as illustrated in FIGS. 1 and 4 in the present embodiment. Emitted air Ar from the foot outlet 141 can be thus directed at the feet 764 of the occupant 76 appropriately not only while the normal driving is being performed but also while the self-driving is being performed. The air conditioning comfort for the occupant 76 can be thus maintained not only while the normal driving is being performed but also while the self-driving is being performed, which is a situation where the normal driving is not performed.

In the present embodiment, the self-driving determined in step S010 in the flowchart described in FIG. 5 corresponds to driving where the vehicle 70 automatically performs all of acceleration, steering, and braking of the vehicle 70, which is, basically, self-driving at level 3 or 4 described above. Air conditioning comfort can be thus maintained during self-driving at level 3 or 4.

Other Embodiments (1) While the occupant 76 illustrated in FIG. 1 is the driver in the embodiment described above, this is presented as an example. If, for example, completely automated self-driving that requires no human involvement is performed in the vehicle 70, the occupant 76 illustrated in FIG. 1 may be a monitor who monitors the completely automated self-driving.

(2) While the outlet changing device 16 includes the turning door 162 that performs the opening/closing operations for changing the location at which emitted air Ar from the foot outlet 141 is directed as illustrated in FIGS. 1 and 4 in the embodiment described above, this is presented as an example. A configuration of the outlet changing device 16 that includes no turning door 162 can be envisaged. For example, the outlet changing device 16 may change the location at which emitted air Ar from the foot outlet 141 is directed by moving or rotating the foot outlet portion 14 that includes the foot outlet 141 in the vehicle front-rear direction DR1. In such cases, the foot outlet 141 does not have to be divided into the first outlet 141a and the second outlet 141b.

To change the location at which emitted air Ar from the foot outlet 141 is directed, a method in which the direction in which air Ar is emitted is changed or a method in which the outlet from which air Ar is emitted is moved in the vehicle front-rear direction DR1 in a translation manner may be employed.

(3) In the embodiment described above, in the flowchart described in FIG. 5, if it is determined in step S010 that the self-driving is being performed, the process proceeds to step S020; however, this is presented as an example. The process may proceed from step S010 to step S020 when, for example, the vehicle 70 is at a temporary stop, thus eliminating the need for the occupant 76 to perform the braking operation using the foot 764, in addition to when the self-driving is being performed. Alternatively, the process may proceed from step S010 to step S020 when the vehicle 70 is at a temporary stop, thus eliminating the need for the occupant 76 to perform the braking operation using the foot 764, in place of when the self-driving is being performed. For example, if the occupant 76 is seated in the driver's seat 74 with the parking brake on, which prevents the vehicle 70 from moving, the controller 20 determines that the vehicle 70 is in a situation where the vehicle 70 is at a temporary stop, thus eliminating the need for the occupant 76 to perform the braking operation using the foot 764.

Figure 6:
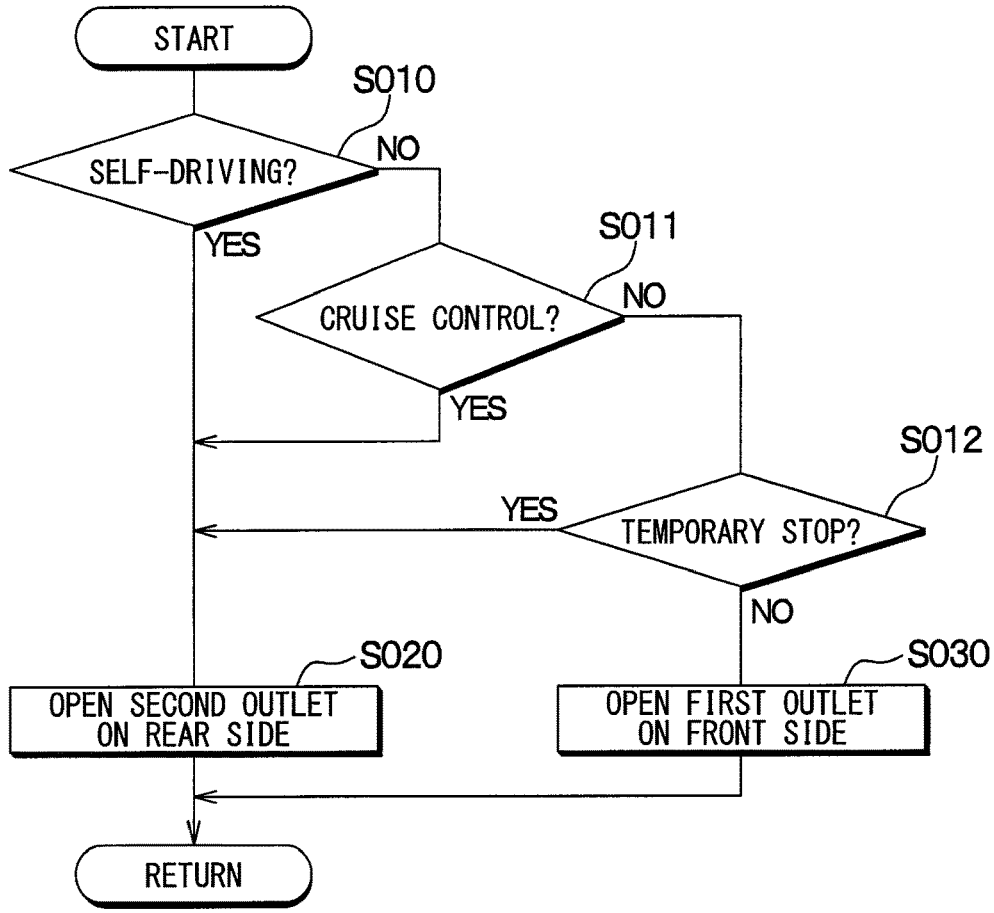
FIG. 6 is a flowchart of a control process performed by a controller included in a vehicle air conditioning unit in other embodiments, the flowchart corresponding to that in FIG. 5.

A flowchart in FIG. 6 specifically describes a control process that includes determination concerning when the vehicle 70 is at a temporary stop, thus eliminating the need for the occupant 76 to perform the braking operation using the foot 764. The flowchart in FIG. 6 includes steps S011 and S012 in addition to steps S010, S020, and S030 described in the flowchart in FIG. 5. Self-driving determined in step S010 in the flowchart of FIG. 6 is the self-driving at level 3 or 4 as in step S010 in FIG. 5. Differences from FIG. 5 are mainly explained in the description of FIG. 6 below.

As described in FIG. 6, if it is determined in step S010 that the self-driving is not being performed, the process proceeds to step S011. In step S011, the controller 20 determines whether the vehicle is being driven using cruise control. The cruise control determined in step S011 includes constant-speed cruise control and following-type cruise control. It is thus determined in step S011 that the vehicle is being driven using cruise control if the vehicle is being driven using, for example, the constant-speed cruise control or the following-type cruise control. The constant-speed cruise control is cruise control that maintains a constant vehicle speed. The following-type cruise control is cruise control that maintains a certain distance or greater from a vehicle ahead and maintains a set vehicle speed while keeping the distance from the vehicle ahead.

If it is determined in step S011 that the vehicle is being driven using the cruise control, the process proceeds to step S020. If it is determined in step S011 that the vehicle is not being driven using the cruise control, the process proceeds to step S012.

In step S012, the controller 20 determines whether the vehicle 70 is at a temporary stop, thus eliminating the need for the occupant 76 to perform the braking operation using the foot 764.

If it is determined in step S012 that the vehicle 70 is at a temporary stop, thus eliminating the need for the occupant 76 to perform the braking operation using the foot 764, the process proceeds to step S020. If it is determined in step S012 that the vehicle 70 is not in a situation where the vehicle 70 is at a temporary stop, thus eliminating the need for the occupant 76 to perform the braking operation using the foot 764, the process proceeds to step S030. Steps S020 and S030 in FIG. 6 are similar to those in FIG. 5.

As described above, in the process described in the flowchart of FIG. 6, if the vehicle 70 is at a temporary stop, thus eliminating the need for the occupant 76 to perform the braking operation using the foot 764 or if the self-driving is being performed, step S020 is executed. In step S020, the controller 20 controls the outlet changing device 16 such that emitted air Ar is directed further toward the rear of the vehicle than during the normal driving.

Emitted air Ar from the foot outlet 141 can be thus directed at the feet 764 of the occupant 76 appropriately not only while the normal driving is performed but also when the vehicle 70 is at a temporary stop, thus eliminating the need for the occupant 76 to perform the braking operation using the foot 764 or while the self-driving is performed. The air conditioning comfort for the occupant 76 can be thus maintained not only while the normal driving is performed but also in other situations where the normal driving is not performed.

While the flowchart in FIG. 6 includes step S011, a flowchart without step S011 can be envisaged. When a flowchart with no step S011 is used, the process proceeds to step S012 instead of step S011 if it is determined in step S010 that the self-driving is not being performed.

(4) In the embodiment described above, while the self-driving determined in step S010 in the flowchart described in FIG. 5 corresponds to driving where the vehicle 70 automatically performs all of acceleration, steering, and braking of the vehicle 70, which is, basically, self-driving at level 3 or 4, this is presented as an example.

The self-driving determined in step S010 in FIG. 5 may include, for example, driving of the vehicle using constant-speed cruise control that maintains a constant vehicle speed. Alternatively, the self-driving determined in step S010 in FIG. 5 may include driving of the vehicle using following-type cruise control that maintains a certain distance or greater from a vehicle ahead and maintains a set vehicle speed while keeping the distance from the vehicle ahead. That is, the self-driving determined in step S010 in the FIG. 5 may be driving that does not require the occupant 76 to operate the vehicle using the foot 764.

In such cases, it is determined in step S010 in FIG. 5 that self-driving is being performed not only when the self-driving at level 3 or 4 is being performed but also when the vehicle is being driven using the constant-speed cruise control or the following-type cruise control.

The self-driving determined in step S010 in the flowchart of FIG. 6 may include driving of the vehicle using the constant-speed cruise control or following-type cruise control described above, as in the case with FIG. 5. In such cases, step S011 is not needed to avoid duplicate determination in FIG. 6. The process thus proceeds to step S012 in place of step S011 if it is determined in step S010 that the self-driving is not being performed.

(5) In the embodiment described above, while the vehicle air conditioning unit 10 includes the controller 20, the controller 20 does not have to be a physically discrete controller. For example, the controller 20 may be included as a functional unit in a controller.

(6) In the embodiment described above, while processing in each step described in the flowchart of FIG. 5 is achieved by a computer program, the steps may be achieved by using hardware logic.

(7) The present disclosure is not limited to the embodiments described above and can be modified in various manners. It is needless to say that any one of components that configure any of the embodiments is not necessarily essential unless otherwise noted expressly in the embodiments or unless a principle apparently requires it.

The numbers of components that configure each of the embodiments, a numerical value, an amount, a range, or any other numerical value, if stated in any of the embodiments, is not a limitation unless it is noted as essential expressly in the embodiments or unless a principle apparently requires it. A material, shape, positional relationship, or the like of any component, if stated in any of the embodiments, is not a limitation unless otherwise noted expressly in the embodiments or unless a principle apparently requires it.

CONCLUSION

In a first aspect indicated by part or all of any of the embodiments described above, the controller of the vehicle air conditioning unit controls the outlet changing device such that emitted air is directed further toward the rear of the vehicle during the self-driving than during the normal driving.

In a second aspect, when the vehicle is at a stop, thus eliminating the need for the occupant to perform the braking operation using a foot or when the self-driving, which eliminates the need for the occupant to operate the vehicle using a foot, is being performed, the controller controls the outlet changing device such that emitted air is directed further toward the rear of the vehicle than during the normal driving.

In a third aspect, a vehicle automatically performs all of acceleration, steering, and braking of the vehicle during the self-driving described above. Air conditioning comfort can be thus maintained during such driving of the vehicle.

What is claimed is:

1. A vehicle air conditioning unit for installation in a vehicle traveling with
    self-driving that eliminates need for an occupant to operate the vehicle by a foot of the occupant, and
    normal driving that requires the occupant to operate the vehicle by the foot,
    the vehicle air conditioning unit comprising:
    a foot outlet portion that defines a foot outlet that opens into a vehicle cabin, blown air flowing through the foot outlet toward the foot of the occupant;
    an outlet changing device that changes a position to which the blown air flowing through the foot outlet flows; and
    a controller configured to control the outlet changing device based on information indicative of whether the self-driving is being performed, such that the blown air is directed further rearward in the vehicle cabin during the self-driving compared to during the normal driving.

* * * * *